UNITED STATES PATENT OFFICE.

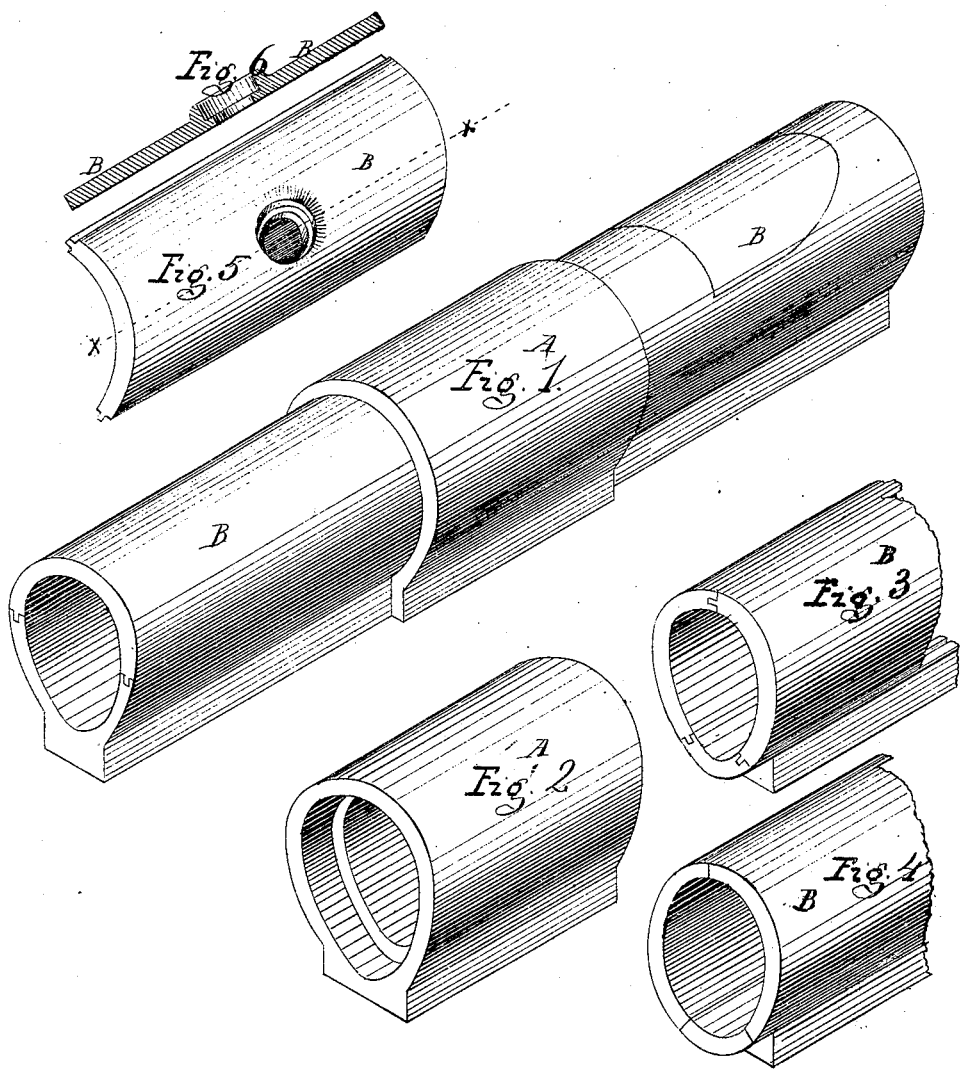

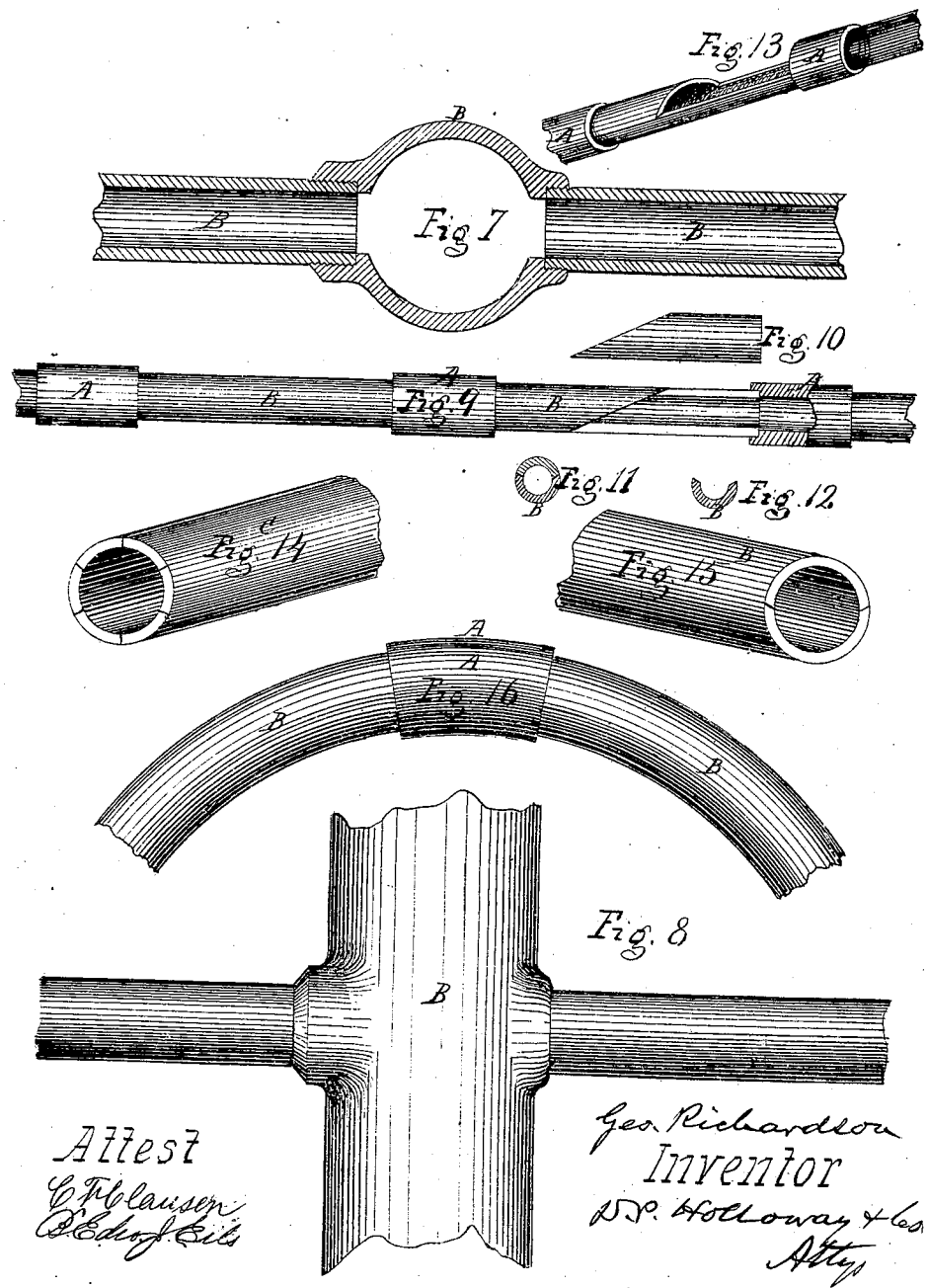

GEORGE RICHARDSON, OF MILWAUKEE, WISCONSIN.

IMPROVEMENT IN DRAIN-PIPES.

Specification forming part of Letters Patent No. 107,103, dated September 6, 1870.

*To all whom it may concern:*

Be it known that I, GEORGE RICHARDSON, of the city and county of Milwaukee, and State of Wisconsin, have invented certain Improvements in Drain or Sewer Pipes; and I do hereby declare the following is a full, clear, and exact description thereof, reference being had to the annexed drawing, making part of this specification, in which—

Figure 1 is a perspective view of my improved pipe and coupling, as they appear when two lengths of pipe are joined together. Fig. 2 is a perspective view of the coupling, showing the shoulder upon its interior surface, and near its ends, against which the sections of the pipe abut when their ends are passed into the coupling. Fig. 3 is a perspective view of a section of the pipe, a portion of which is broken away, showing it as being constructed in three longitudinal sections, and having tongue-and-groove joints. Fig. 4 is a perspective view of the section shown in Fig. 3, but showing the longitudinal joints plain, or as beveled only so as to fit the sections to which each section is joined. Fig. 5 is an elevation of one of the longitudinal sections of the pipe, showing how a lateral or branch pipe may be connected thereto. Fig. 6 is a transverse section, on line *x x* of Fig. 5, showing the socket to which the lateral or branch pipe may be attached. Fig. 7 is a transverse sectional elevation of a section of pipe, the aperture through which is circular in form, showing how lateral or branch pipes may be connected thereto. Fig. 8 is a plan of a pipe and its branches, as shown in Fig. 7. Fig. 9 is an elevation of a series of pipes and couplings joined together, a portion of one section of the pipes being cut away, to show how a man-hole may be formed therein, for the purpose of providing the means of giving access to the interior of the pipe, and the manner of applying the removable section. Fig. 10 shows the section which has been removed from Fig. 9. Figs. 11 and 12 are end views of the pipe and of the removable sections. Fig. 13 is a perspective view, showing the pipe, the man-hole of which has been removed. Fig. 14 is a perspective view of a pipe which is to be made in sections or staves, to be placed vertically over the man-hole or removable portion of the longitudinal pipes, for affording access thereto. Fig. 15 shows a section of round pipe with the beveled joints. Fig. 16 shows curved pipes, joined together by means of a curved coupling.

Corresponding letters refer to corresponding parts in the several figures.

This invention relates to that class of pipes known as drain or sewer pipes, and which are or may be used to convey water, gas, or any other material usually conveyed in pipes; and it consists in the construction, combination, and arrangement of the parts of which it is composed, as will be more fully explained hereinafter.

A in the drawing refers to a coupling or joining-piece for pipes, the aperture through which may be of the elongated form shown in Fig. 2, or it may be of the circular form shown in Fig. 7, or of any other suitable form, its interior diameter or area being the same as that of the pipes which it connects. At the ends of this coupling the diameter or area of the aperture is enlarged for the distance of from one to two inches, so as to be equal to that of the outer diameter of the pipes which are to be connected to it.

This form of construction provides a shoulder in the interior of the coupling, against which the ends of the pipes abut, the portions of the coupling which project beyond such shoulder passing over and holding the pipes in position. This coupling may be made with a flattened bottom, as shown in Fig. 2, or its outer character may be a perfect circle, or of any other form that may be preferred.

The great advantage resulting from this form of coupling is that it is very strong, and does not present any projecting parts which are liable to be broken off by handling, which is the case with the usual forms of couplings, especially when the pipes are made of clay, cement, or other earthy matters, as this will generally be.

To the sides or other parts of the pipes which enter the coupling, lateral or branch pipes may be attached, as shown in Figs. 7 and 8, apertures being formed therein for that purpose, such apertures being surrounded by a raised collar or boss for receiving the pipes, and for the purpose of forming a shoulder for them to abut against. These lateral pipes may be screwed into the main pipe, as shown in Fig. 7, or they may be made to slide in, and be cemented to the same with any suitable material for that purpose.

B refers to the pipes above alluded to, which are made in sections of suitable length, their outer diameter being such as to cause them to fit into the enlarged aperture formed in the coupling A. These sections are divided longitudinally into two sections, as shown in Fig. 1, or into three, as shown in Figs. 3 and 4, so that they may be more readily molded and put in place, especially when large pipes are used. These longitudinal joints may be of the tongue-and-groove form, or they may be simply beveled, so as to cause each section to fit the one with which it comes in contact.

In laying drain or sewer pipes it is important that some means of access to their interior should be provided, and, to accomplish this means, I cut away a portion of one of the longitudinal sections of the pipe B, as shown in Figs. 9 and 13, which cut or removable portion forms a man-hole, through which a person may easily enter the pipe, in all cases when the pipe is large enough to permit such entrance. This cut-away portion should be near or at the end of one of the sections, in order that, when placed upon the other portion of the pipe, its end may enter the cavity formed in the coupling, and thus be held in its proper position with reference thereto and to the other portion of the pipe.

When the removable sections forming man-holes are used in pipes which are laid under ground, some means of access to them is necessary, and, to provide such means conveniently, a vertical pipe, made of the same material as are the longitudinal pipes, or of any other suitable material, is provided, such vertical pipes being made in sections or staves, as shown in Fig. 14, such staves being of any length that may be required to enable them to reach from the longitudinal pipes to the surface of the earth, and their diameter being such as to admit of a person passing down into them to remove the man-hole.

Having thus described my invention,

What I claim, and desire to secure by Letters Patent, is—

1. The coupling A, having a smooth or even exterior surface, as described, the enlarged recesses, with their abutments, and its interior diameter of the same area as the pipes which are joined to it, substantially as and for the purpose set forth.

2. The arrangement of the removable or man-hole portion of the pipe with reference to the coupling, it being such that, when in position upon the fixed portion of the pipe, it shall be held in its place by the coupling, substantially as shown and described.

3. The combination of the pipe B, with its removable portion, and the vertical pipe C, when constructed and arranged substantially as and for the purpose specified.

In testimony whereof I have signed my name to this specification in the presence of two subscribing witnesses.

GEO. RICHARDSON.

Witnesses:
C. F. CLAUSEN,
B. EDW. J. EILS.